US009701065B2

(12) United States Patent
Hang et al.

(10) Patent No.: US 9,701,065 B2
(45) Date of Patent: Jul. 11, 2017

(54) BLUE-RAY PHOTOCURING 3D PRINTING PEN

(71) Applicant: Nanjing Baichuan Xingyuan Laser Technology Co., Ltd., Nanjing (CN)

(72) Inventors: Haibo Hang, Nanjing (CN); Yaowen Liu, Nanjing (CN); Shouwen Dou, Nanjing (CN)

(73) Assignee: Nanjing Baichuan Xingyuan Laser Technology Co., Ltd., Nanjing (CN)

(*) Notice: Subject to any disclaimer, the term of this patent is extended or adjusted under 35 U.S.C. 154(b) by 0 days.

(21) Appl. No.: 15/005,023

(22) Filed: Jan. 25, 2016

(65) Prior Publication Data

US 2016/0361867 A1    Dec. 15, 2016

(30) Foreign Application Priority Data

Nov. 25, 2014  (CN) .......................... 2014 1 0689870

(51) Int. Cl.
| | |
|---|---|
| *B29C 67/00* | (2017.01) |
| *B33Y 50/02* | (2015.01) |
| *B33Y 30/00* | (2015.01) |
| *B29C 47/00* | (2006.01) |
| *B33Y 10/00* | (2015.01) |
| *B33Y 40/00* | (2015.01) |

(52) U.S. Cl.
CPC ........ *B29C 67/007* (2013.01); *B29C 67/0055* (2013.01); *B29C 67/0085* (2013.01); *B29C 67/0088* (2013.01); *B33Y 50/02* (2014.12); *B29C 47/0002* (2013.01); *B29C 47/0014* (2013.01); *B33Y 10/00* (2014.12); *B33Y 30/00* (2014.12); *B33Y 40/00* (2014.12)

(58) Field of Classification Search
None
See application file for complete search history.

(56) References Cited

U.S. PATENT DOCUMENTS

| | | | | |
|---|---|---|---|---|
| 1,657,033 | A * | 1/1928 | Pollock | B43K 5/14 206/525 |
| 9,266,286 | B1 * | 2/2016 | Starodubtsev | B33Y 30/00 |
| 2011/0233804 | A1 * | 9/2011 | Batchelder | B29C 67/0055 264/40.4 |
| 2015/0125702 | A1 * | 5/2015 | He | C08K 3/36 428/413 |
| 2016/0059481 | A1 * | 3/2016 | Starodubtsev | B29C 47/92 264/494 |

FOREIGN PATENT DOCUMENTS

| | | |
|---|---|---|
| CN | 103341975 A | 10/2013 |
| GB | 455186 | * 10/1936 |

* cited by examiner

*Primary Examiner* — Matthew Daniels
*Assistant Examiner* — Manley Cummins, IV
(74) *Attorney, Agent, or Firm* — Gokalp Bayramoglu

(57) ABSTRACT

The technical solution for reaching the object of this invention is as follows: a blue-ray photocuring 3D printing pen, comprising a casing, an ink cartridge located within the casing, a penpoint located on the head end of the ink cartridge and extending out the casing, a photosensitive resin placed within the ink cartridge. The blue-ray photocuring 3D printing pen further comprises a plurality of blue-ray LED arranged around the circumference of the penpoint. The photosensitive resin is capable of flowing out of the penpoint, and the blue-ray is configured to irradiate and solidify the photosensitive resin, wherein the wavelength of the blue-ray LED ranges from 465 nm to 485 nm.

7 Claims, 5 Drawing Sheets

BLUE-RAY PHOTOCURING 3D PRINTING PEN

TECHNICAL FIELD

This invention relates to a three-dimensional (3D) printing pen, especially relates to a blue-ray photocuring printing pen.

BACKGROUND 3D printing is one of the rapid prototyping techniques. It is a technology based on the digital model data and using bondable material, such as metal powder or plastics, to fabricate a physical model by layer-to-layer printing method.

Photocuring is a rapid developing "green" new technology. Compared to the traditional coating curing technique, the photocuring has the advantages of energy saving, non-polluting, high-efficiency, and excellent performance.

Pen is one of the human's great inventions. It is the tool for writing or painting. Most pens have a penpoint, which leads colored solid or liquid (ink) to the paper or other solid surface for painting characters, symbols or drawing.

CN Patent No. 103341975A, publicated on Oct. 9, 2013, discloses a 3D printing pen that extrudes the plastic, which is melted in the heating chamber. However, the temperature of the melting plastic is up to two hundred degrees, which is prone to scald the user and results in the existence of potential risk.

Therefore, it is necessary to provide a new 3D printing pen.

SUMMARY OF THE INVENTION

The object of this invention is to provide a blue-ray photocuring 3D printing pen.

The technical solution for reaching the object of this invention is as follows: a blue-ray photocuring 3D printing pen, comprises a casing, an ink cartridge located within the casing, a penpoint located on the head end of the ink cartridge and extending out the casing, a photosensitive resin placed within the ink cartridge. The blue-ray photocuring 3D printing pen further comprises a plurality of blue-ray LEDs (Lighting Emitted Diode) arranged around the circumference of the penpoint, the photosensitive resin is capable of flowing out the penpoint, the blue-ray is configured to irradiate and solidify the photosensitive resin, the wavelength of the blue-ray LED ranged from 465 nm to 485 nm.

Preferably, the blue-ray photocuring 3D printing pen further comprises a piston which is located within the ink cartridge and capable of sliding forward in the ink cartridge, and a step motor configured to drive the piston to move forward.

Preferably, the blue-ray photocuring 3D printing pen further comprises a threaded pushrod, the threaded pushrod goes through the step motor and extends to the ink cartridge for contacting with the piston, the step motor controls the piston to move forward by driving the threaded pushrod.

Preferably, a plurality of LED lamp holders are located on the inner wall of the front end of the casing, the plurality of blue-ray LEDs are respectively placed in the plurality of LED lamp holders.

Preferably, the penpoint is hollow, the rear end of the penpoint comprises an external thread. The ink cartridge comprises a connection member located on the head end of the ink cartridge, a retainer which is located on the rear end of the ink cartridge and configured to retain the photosensitive resin, and an inclined member which is located between the connection member and the retainer; wherein an internal thread is set in the inner wall of the head end of the connection member; the external thread on the rear end of the penpoint matches with the internal thread on the head end of the connection member of the ink cartridge, so that the penpoint can be assembled to the head end of the ink cartridge.

Preferably, the step motor is set in the rear end of the ink cartridge.

Preferably, a pushrod connecting piece is set on the rear end of the threaded pushrod; the blue-ray photocuring 3D printing pen further comprises an ink-level indicating window is set on the casing; the pushrod pushes the piston forward gradually, when the pushrod connecting piece can be seen from the ink-level indicating window, it indicates that the photosensitive resin is out.

Preferably, the blue-ray photocuring 3D printing pen further comprises a control board. The control board is a PCB (Printed Circuited Board), wherein the control board comprises a blue-ray LED controlling module, a button detecting module, a sensing module, a power managing module, a speed governing module, a motor driving module.

Preferably, the blue-ray photocuring 3D printing pen further comprises a button panel, an operating button and an irradiating button, wherein the button panel, operating button and the irradiating button are respectively located on the casing and electrically connected to the control board.

Preferably, the photosensitive resin includes acrylic ester, epoxy resin, free-radical initiator, cationic initiator, diluent, fumed silica; both of the free-radical indicator and the cationic initiator are blue-ray photosensitive indicator.

Compared to the existing technology, the blue-ray photocuring 3D printing pen in this invention has at least the following advantages: the photocuring demands a pretty low temperature. Therefore high-temperature is not needed, which saves 90% of energy consumption and prevents the user from scalding. The blue-ray LED lamp is capable of rapidly photocuring and is easier for molding, which saves lots of time. The blue-ray LED lamp belongs to visible light. It does not contain the ultraviolet ray, would not produce ozone, would not scald the user's skin, and would not pollute the atmosphere and water. At the same time, the cured product has a better performance, is better wear resistant, and can have anti-dissolving and anti-impacting properties.

BRIEF DESCRIPTION OF THE DRAWINGS

In order to clarify this invention, a further detailed description will made below in conjunction with embodiment and figures.

DETAILED DESCRIPTION OF THE INVENTION

This invention is a blue-ray photocuring 3D printing pen. This invention is further described in conjunction with the drawings as follows.

Figure 1:
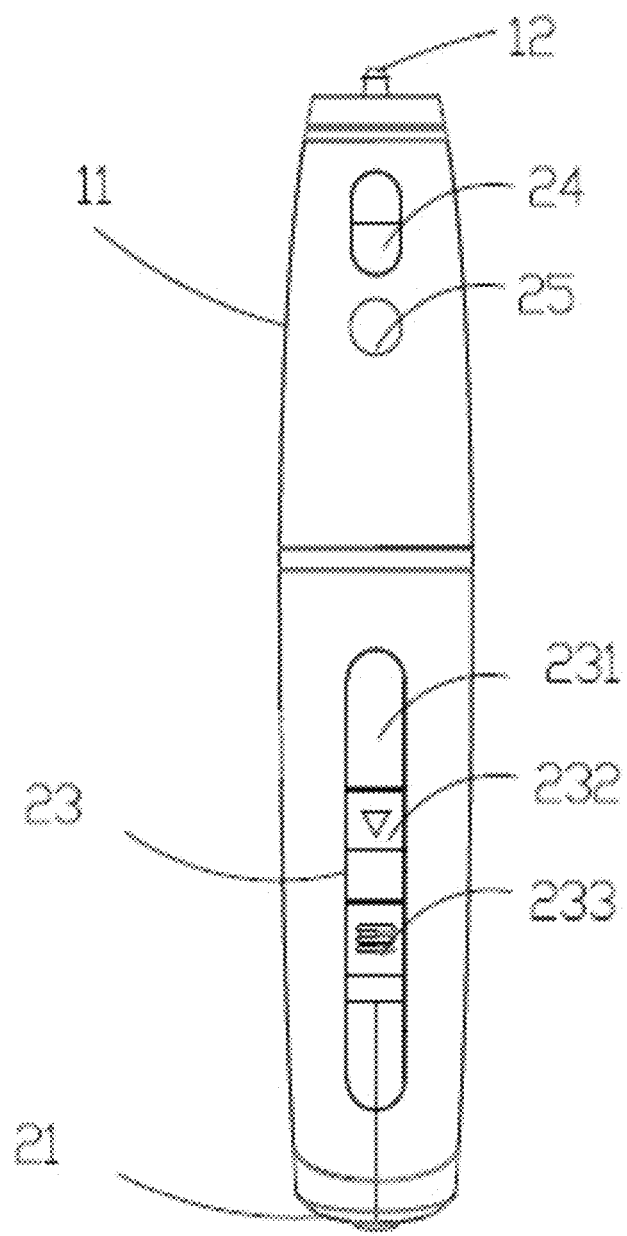
FIG. 1 is a schematic diagram of a blue-ray photocuring 3D printing pen in this invention.
Figure 2:
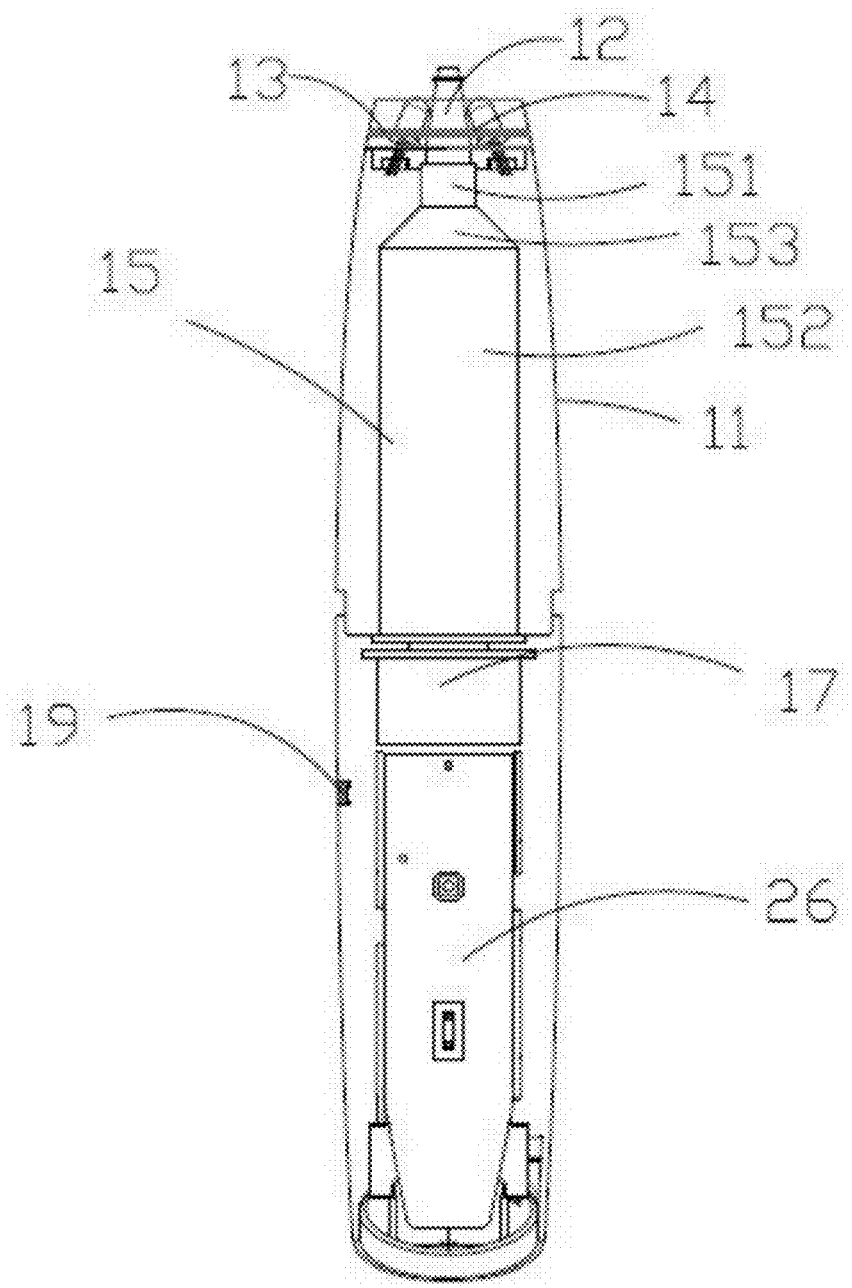
FIG. 2 is a schematic diagram of the blue-ray photocuring 3D printing pen without the casing in this invention.
Figure 3:
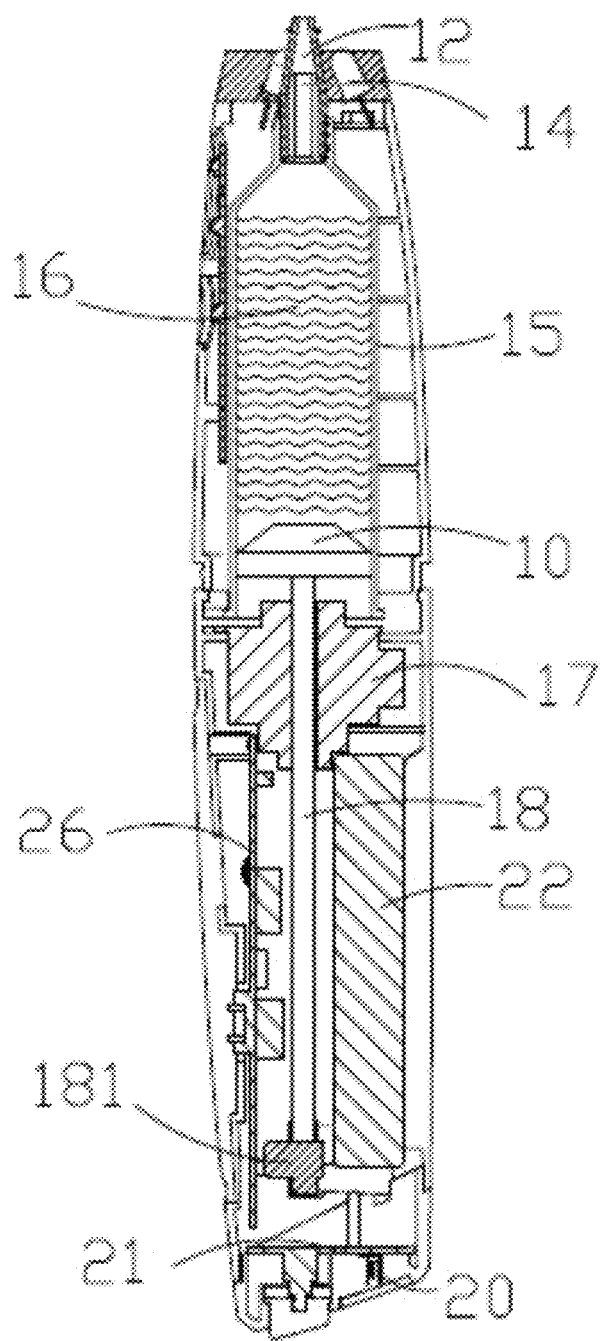
FIG. 3 is a section view of the blue-ray photocuring 3D printing pen in this invention.
Figure 4:
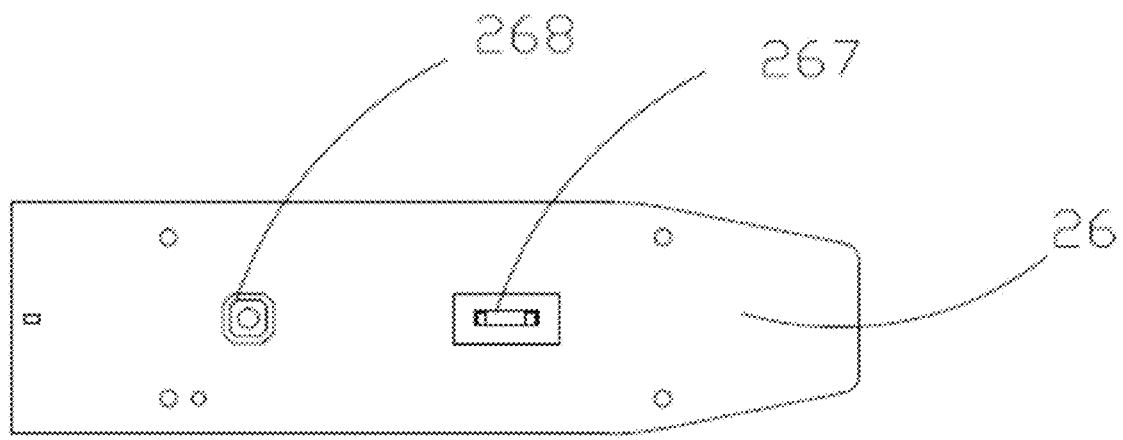
FIG. 4 is a schematic diagram of one side of the control board in this invention.
Figure 5:
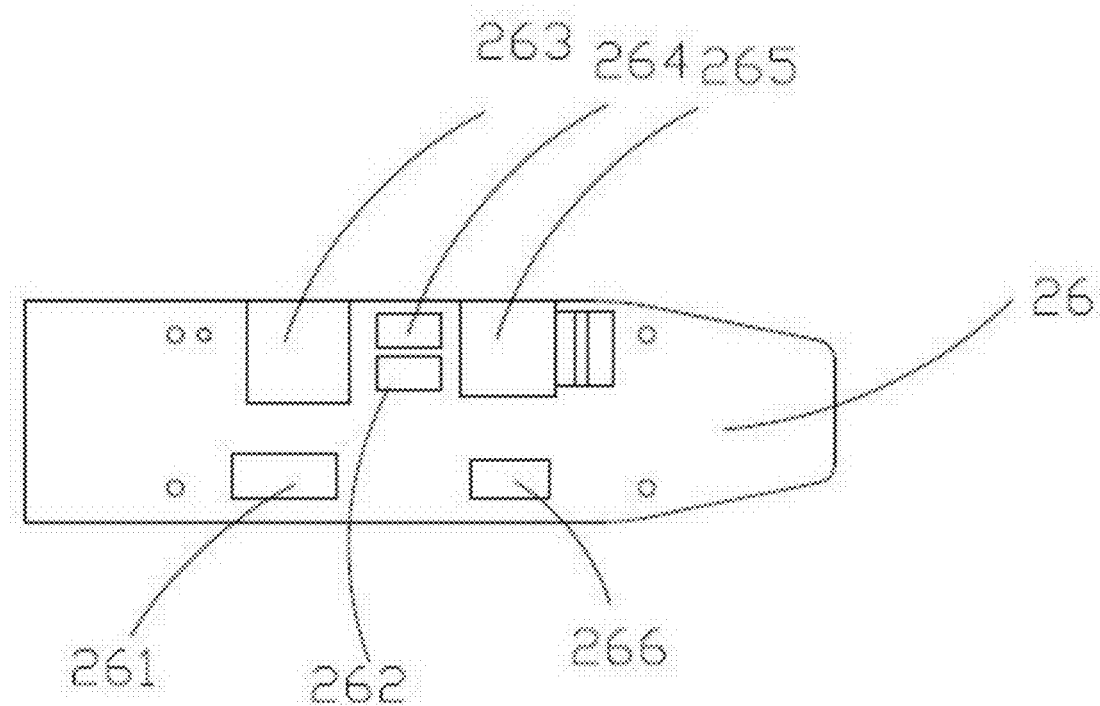
FIG. 5 is a schematic diagram of another side of the control board in this invention.

As shown from FIG. 1 to FIG. 5, the blue-ray photocuring 3D printing pen comprises casing 11, ink cartridge 15 located within the casing 11, penpoint 12 located on the head end of ink cartridge 15 and extending out of casing 11, several of blue-ray LEDs 14 arranged around the head end of the ink cartridge 15, piston 10 which is located within ink cartridge 15 and capable of sliding forward in ink cartridge 15, photosensitive resin 16 placed within ink cartridge 15, step motor 17 configured to drive piston 10 to move forward, threaded pushrod 18 which goes through step motor 17 and contacts with piston 10, battery 22 set on the rear end of step motor 17, control board 26, power switch 21 set on rear end of casing 11, charging interface 20 set on power switch 21.

LED lamp holders 13 are set on the inner wall of the head end of casing 11, several of LEDs 14 are respectively set in LED lamp holders 13.

Penpoint 12 is hollow, and an external thread (not shown) is set on the rear end of the penpoint.

Ink cartridge 15 comprises connection member 151, retainer 152, and inclined member 153; wherein connection member 151 is located at the head end of ink cartridge 15, retainer 152 is located at the rear end of ink cartridge 15 and configured to retain photosensitive resin 26, and inclined member 153 is located between connection member 151 and retainer 152; wherein an internal thread (not shown) is set on the inner wall of the head end of connection member 151; the external thread on the rear end of penpoint 12 matches with the internal thread on the head end of connection member 151 of ink cartridge 15, so that penpoint 12 can be assembled to the head end of ink cartridge 15.

The number of blue-ray LEDs 14 is three, and the blue-ray LEDs are arranged evenly around the circumstance of penpoint 12. The wavelength of the blue-ray LED ranges from 465 nm to 485 nm. Photosensitive resin 16 is sensitive to the wavelength ranged from 465 nm to 485 nm. Photosensitive resin 16 includes acrylic ester, epoxy resin, free-radical initiator, cationic initiator, diluent, fumed silica. Both of the free-radical indicator and the cationic initiator are blue-ray photosensitive indicator.

Step motor 17 is set on the rear end of ink cartridge 15.

Pushrod connecting piece 181 is set on the rear end of threaded pushrod 18; threaded pushrod 18 goes through step motor 17 and extends into ink cartridge 15 for contacting with piston 10; step motor 17 controls piston 10 to move forward by driving threaded pushrod 18.

Charging interface 20 is a USB (Universal Serial Bus) interface.

The blue-ray photocuring 3D printing pen further comprises button panel 23, operating button 24, irradiating button 25, ink-level indicating window 19; wherein the button panel 23, operating button 24, irradiating button 25 and ink-level indicating window 19 are set on casing 11; wherein button panel 23 comprises status indicator lamp 231, back button 232, speed governing button 233; button panel 23, operating button 24 irradiating button 25 are electrically connected to control board 26; status indicator lamp 231 is configured to display the power condition of battery 22; back button 232 is configured to control the operating condition for step motor 17, and speed governing button 233 is configured to control the operating speed of step motor 17; ink-level indicating window 19 is configured to show the remaining of photosensitive resin 16; as photosensitive resin 16 is running out gradually, pushrod 18 pushes piston 10 forward gradually till pushrod connection piece 181 on pushrod 18 can be seen from ink-level indicating window 19, which means that photosensitive resin 16 is out.

Control board 26 is a printed circuit board (PCB); blue-ray LED controlling module 261, button detecting module 262, sensing module 263, power managing module 264, speed governing module 265, motor driving module 266 are set on one side of control board 26; back switch 267 and speed governing switch 268 are set on the other side of control board 26, wherein back switch 267 corresponds to back button 232 and speed governing switch 268 corresponds to speed governing button 233 corresponding to back button.

Power switch 21 is electrically connected to battery 22, battery 22 is electrically connected to control board 26; wherein power switch 21 is configured to control the power supplied for the blue-ray photocuring 3D printing pen; charging interface 20 is electrically connected to power managing module 264 for charging battery 22.

Pressing power switch 21, the blue-ray photocuring 3D printing pen enters standby mode; pressing operating button 24, step motor 17 and blue-ray LED 14 start working. Step motor 17 leads pushrod 18 to move forward straightly, and then push piston 10 in ink cartridge 15 to move forward. As a result, photosensitive resin 16 in ink cartridge 15 can be extruded out from penpoint 12. At this time, blue-ray LEDs 14 irradiate and cure the extruded photosensitive resin 16. Pressing back button 232 when photosensitive resin 16 in ink cartridge 15 is out, and then step motor 17 will reverse which leads pushrod 18 draw back rapidly. Replacing ink cartridge 15, and then the blue-ray photocuring 3D printing pen can be used again. Turning on power switch 21, blue-ray LED 14 will be synchronously extinguished when sensing module 263 senses that penpoint 12 is upward, and meanwhile irradiating button 25 will stop working for protecting the user's eyes.

This provided blue-ray photocuring 3D printing pen demands a pretty low temperature. Therefore, high-temperature is not needed when working, which saves 90% of energy consumption and prevents users from scalding. The blue-ray LED lamp is capable of rapidly photocuring and is easier for molding, which saves lots of time. The blue-ray LED lamp belongs to visible light It does not contain the ultraviolet ray, would not produce ozone, would not scald the user's skin, and would not pollute the atmosphere and water. At the same time, the cured product has a better performance and better wear resistant, and can has anti-dissolving and anti-impacting properties.

Above descripted embodiments are for clarifying the object, technique solution and advantages of this invention. It should be noted that, above embodiment is merely one of embodiments in this invention, which should not be regarded to limit the present invention. Therefore, those variations made to the embodiments without departing from the spirit of the disclosure as claimed should be regarded as in the scope of this invention.

What is claimed is:

1. A blue-ray photocuring 3D (three-dimensional) printing pen, comprising:
  a casing, an ink cartridge, a penpoint, a photosensitive resin, a plurality of blue-ray LEDs (Light Emitting Diode), and a sensing module;
  wherein the ink cartridge is located within the casing, the penpoint is located at the head end of the ink cartridge and extending out of the casing, the photosensitive resin is placed within the ink cartridge; the plurality of blue-ray LEDs (Light Emitting Diode) are arranged around the circumference of the penpoint, the photosensitive resin is capable of flowing out the penpoint, the blue-ray LED is configured to irradiate and solidify the photosensitive resin, the wavelength of the blue-ray LED ranged from 465 nm to 474 nm;

wherein the photosensitive resin is sensitive to a wavelength ranged from 465 nm to 474 nm, the photosensitive resin including acrylic ester, epoxy resin, free-radical initiator, cationic initiator, diluent, and fumed silica, both the free-radical initiator and the cationic initiator being blue-ray photosensitive initiators;

wherein the blue-ray photocuring 3D printing pen further comprises a piston, which is located within the ink cartridge and is capable of sliding forward in the ink cartridge, and a step motor configured to drive the piston to move forward;

wherein the blue-ray photocuring 3D printing pen further comprises a threaded pushrod, the threaded pushrod goes through the step motor and extends to the ink cartridge for connecting with the piston, the step motor controls the piston to move forward by driving the threaded pushrod;

wherein a pushrod connecting piece is fixedly connected to the rear end of the threaded pushrod, the piston is fixedly connected to the front end of the threaded pushrod;

wherein the plurality of blue-ray LEDs are configured to be synchronously extinguished when the sensing module senses that the penpoint is upward.

2. The blue-ray photocuring 3D printing pen according to claim 1, wherein a plurality of LED lamp holders are located on the inner wall of the front end of the casing, and the plurality of blue-ray LEDs are respectively placed in the plurality of LED lamp holders.

3. The blue-ray photocuring 3D printing pen according to claim 1, wherein the penpoint is hollow, and the rear end of the penpoint comprises an external thread;

wherein the ink cartridge comprises a connection member, a retainer, and an inclined member; wherein the connection member is located at the head end of the ink cartridge, the retainer is located on the rear end of the ink cartridge and configured to retain the photosensitive resin, and the inclined member is located between the connection member and the retainer; wherein an internal thread is set in the inner wall of the head end of the connection member; the external thread on the rear end of the penpoint matches with the internal thread on the head end of the connection member of the ink cartridge, so that the penpoint is assembled to the head end of the ink cartridge.

4. The blue-ray photocuring 3D printing pen according to claim 1, wherein the step motor is set on the rear end of the ink cartridge.

5. The blue-ray photocuring 3D printing pen according to claim 1, wherein the blue-ray photocuring 3D printing pen further comprises an ink-level indicating window, which is set on the casing; the pushrod pushes the piston forward gradually, it indicates that the photosensitive resin is out when the pushrod connecting piece is seen from the ink-level indicating window.

6. The blue-ray photocuring 3D printing pen according to claim 1, wherein the blue-ray photocuring 3D printing pen further comprises a control board, the control board is a Printed Circuited Board (PCB), wherein the control board comprises a blue-ray LED controlling module, a button detecting module, a power managing module, a speed governing module, and a motor driving module.

7. The blue-ray photocuring 3D printing pen according to claim 6, wherein the blue-ray photocuring 3D printing pen further comprises a button panel, an operating button and an irradiating button, wherein the button panel, operating button and the irradiating button are respectively located on the casing and electrically connected to the control board.

* * * * *